United States Patent
Kubo et al.

[19]

[11] Patent Number: 5,963,343
[45] Date of Patent: Oct. 5, 1999

[54] SCANNER

[75] Inventors: Shinya Kubo; Tetsuichiro Yamamoto, both of Tokyo, Japan

[73] Assignee: NEC Corporation, Tokyo, Japan

[21] Appl. No.: 08/803,457

[22] Filed: Feb. 20, 1997

[30] Foreign Application Priority Data

Feb. 20, 1996 [JP] Japan .................................. 8-032384

[51] Int. Cl.$^6$ .................................................. H04N 1/024
[52] U.S. Cl. .......................................... 358/473; 382/313
[58] Field of Search .................................... 382/313–315; 358/473–474, 494; 250/231.14, 231.16, 231.18; 341/13

[56] References Cited

U.S. PATENT DOCUMENTS

| | | | |
|---|---|---|---|
| 4,387,374 | 6/1983 | Wiener | 250/231.18 |
| 4,523,235 | 6/1985 | Rajchman | 358/473 |
| 4,684,998 | 8/1987 | Tonioka et al. | 358/473 |
| 4,862,512 | 8/1989 | Hidaka et al. | 382/313 |
| 4,959,871 | 9/1990 | Mori et al. | 358/473 |
| 5,084,773 | 1/1992 | Yonenaga | 358/473 |
| 5,369,271 | 11/1994 | Nyui | 250/231.16 |
| 5,475,503 | 12/1995 | Huang et al. | 358/473 |

FOREIGN PATENT DOCUMENTS

| | | | |
|---|---|---|---|
| 62-248367 | 10/1987 | Japan | H04N 1/04 |
| 63-163060 | 10/1988 | Japan | H04N 1/04 |
| 63-245061 | 10/1988 | Japan | H04N 1/04 |
| 5-281624 | 10/1993 | Japan | G03B 27/50 |
| 8-204918 | 8/1996 | Japan | H04N 1/04 |

*Primary Examiner*—Jon Chang
*Assistant Examiner*—Jingge Wu
*Attorney, Agent, or Firm*—Foley & Lardner

[57] ABSTRACT

When the scanner moves over the subject copy, the first reading elements of a close contact type image sensor (1) read the copy. As the movement causes a platen roller (5) to rotate, an encoder ring (4), having a prescribed distinguishing pattern (10) printed within, rotates. Second reading elements configured outside the copy reading range of the close contact type image sensor (1) read the distinguishing pattern, which moves over the reading face as the encoder ring (4) rotates. The second reading elements which read the distinguishing pattern are driven independently of the first reading elements for reading the subject copy, and their reading period is shorter than that of the first reading elements. This configuration enables the moving speed to be accurately detected even when the scanner moves faster than the copy reading speed.

8 Claims, 8 Drawing Sheets

SCANNER

BACKGROUND OF THE INVENTION

1. Field of the Invention

The present invention relates to a scanner for scanning an original copy while it is manually moved over it.

2. Description of the Prior Art

A conventional scanner which scans the original copy while being manually moved over it uses a moving speed detector to equalize the length of the output picture in the subscanning direction to that of the original copy. The scanner constantly detects the moving speed in the subscanning direction with its moving speed detector, and controls the number of picture output lines per unit length in the subscanning direction according to the detected moving speed.

FIGS. 9 and 10 are schematic diagrams of the moving speed detector of a hand scanner according to the prior art and of the structure of an encoder gear used in that detector, respectively. As illustrated in FIG. 9, the conventional moving speed detector is provided with a platen roller 5 which, in close contact with the original copy, rotates with the movement of the hand scanner; an encoder gear 12 which is rotated by the rotation of the platen roller 5 via gears 11a, 11b and 11c; and a photo interrupter 13 arranged so as to sandwich part of the encoder gear 12.

The encoder 12, in which a plurality of slits 12A are cut as shown in FIG. 10, either transmits or interrupts light from the light emitting section of the photo interrupter 13 as the encoder rotates. A speed detecting circuit (not shown) detects the rotating speed of the platen roller 5 by counting the periods of output pulse signals from the photo interrupter 13, which generates with the rotation of the encoder gear 12.

This moving speed detector, however, involves a large number of parts because it uses a plurality of gears including the encoder, resulting in a large mechanism and a high cost. Moreover, as the rotation of the platen roller is transmitted to the encoder gear via several gears, the speed detection is subject to errors, especially when the detector is started or stopped on account of clearances between the gears.

Meanwhile, the Gazette of the Japanese Patent Laid-open No. 248367 of 1987 (filed on Apr. 22, 1986) discloses a more compactly designed scanner. This scanner has an image sensor 72 arranged over an original copy 71 as illustrated in FIG. 11. The image sensor 72, as it scans the original copy 71, is manually moved along the subject copy 71 to subscan it. A belt 73, on which black-and-white pattern is recorded as shown in FIG. 12, is wound around the image sensor 72 as if to wrap two-bit reading elements S1 and S2 in, provided at an end of the image sensor 72. The belt 73, having a rotating shaft supported by the image sensor 72, is in contact with the subject copy 71, and turns as the image sensor 72 moves for subscanning.

As the belt 73 turns with the subscanning movement of the image sensor 72, the reading elements S1 and S2 at the end of the image sensor 72 read the periods of variations of the black-and-white pattern, and thereby detect the quantity of the movement of the image sensor 72. This scanner enables the quantity of movement to be detected accurately by having the two-bit reading elements read two rows of black-and-white pattern which are out of phase with each other.

The scanner disclosed in the Gazette of the Japanese Patent Laid-open No. 248367 of 1987 involves the following problems.

First, as it detects the reading speed from the phase lag between the two rows of black-and-white pattern read by the two-bit reading elements S1 and S2 of the image sensor 72, the black-and-white pattern recorded on the belt requires accuracy to below $1/16$ mm when the resolution of the image sensor is, for instance, 200 dpi.

Second, if the black-and-white pattern is smeared, the quantity of movement cannot be detected accurately, because errors will occur on at least one of the outputs of the two reading elements to make it impossible to detect the phase lag accurately. Therefore, the control of the reading period according to the output of the detection of movement quantity would not function normally. If the resolution is 400 dpi or more, the adverse effect of smear will be even greater.

Third, the reading period of the subject copy reading elements and that of the reading elements S1 and S2 for reading the black-and-white pattern are presumed to be the same. However, if the moving speed of the scanner becomes faster than the reading speed of the image sensor, the outputs of detection of the black-and-white pattern on the belt 13 by the two reading elements S1 and S2 will become incorrect, making it impossible to accurately perceive the movement quantity of the scanner and resulting in the problem of inability to recognize any unclearness of the read picture that may occur.

SUMMARY OF THE INVENTION

A first object of the present invention is to provide a scanner reduced in size and in the number of parts and improved in the accuracy of moving speed detection.

A second object of the invention is to provide a scanner capable of accurately perceiving the quantity of movement of the scanner even if the moving speed of the scanner becomes faster than the reading speed of the image sensor.

A third object of the invention is to provide a scanner having a moving speed detector capable of normally detecting the moving speed even if the pattern for detecting the moving speed is smeared.

A scanner according to the invention uses a close contact type image sensor permitting manual scanning. The close contact type image sensor has first reading elements, arranged in the main scanning direction, for reading the original copy, and second reading elements which, arranged outside the scanning area in the main scanning direction. The second reading elements can be driven independently of the first reading elements. On one side of the close contact type image sensor is arranged a cylindrical rotating body. The cylindrical rotating body has its internal face over the scanning area of the second reading elements and, with a predetermined distinguishing pattern for detecting rotation speed formed on that internal face, rotates in the subscanning direction. A platen roller is arranged on the opposite side to this cylindrical rotating body with respect to the main scanning direction, with the scanning area of the first reading elements in-between, and rotates at the same speed as the cylindrical rotating body, to which it is connected by the same shaft. A detecting circuit detects the rotating speed of the platen roller on the basis of the detection output signals for the distinguishing pattern read by the second reading elements of the close contact type image sensor.

This configuration enables the platen and the cylindrical rotating body to rotate on the same axis, makes it possible to simplify the structure and reduce its size and, moreover, to accurately detect the moving speed (the rotating speed of the platen) because no gear is used.

According to the invention, the reading period of the second reading element, characteristically, is shorter than that of the first reading elements. This enables the moving speed to be accurately detected even if the moving speed of the close contact type image sensor is faster than the scanning speed.

In a preferred embodiment of the invention, having a plurality of second reading elements, arranged in the main scanning direction, for detecting the distinguishing patterns, the detecting circuit detects the rotating speed of the platen by adding the detection output signals for the distinguishing pattern read by the plurality of second reading elements and comparing them with a predetermined threshold. This arrangement makes the detection less vulnerable to the influences of smear or dust on the distinguishing pattern and thereby increases the reliability of moving speed detection.

In the embodiment of the invention, the detection length in the main scanning direction on the second reading elements is greater than that on the first reading elements. This enables the second reading elements, even if their reading period is shorter than that of the first reading elements, achieve a comparable level of resolution to that of the first reading elements with no drop in output level.

DETAILED DESCRIPTION OF THE PREFERRED EMBODIMENT

Figure 1:
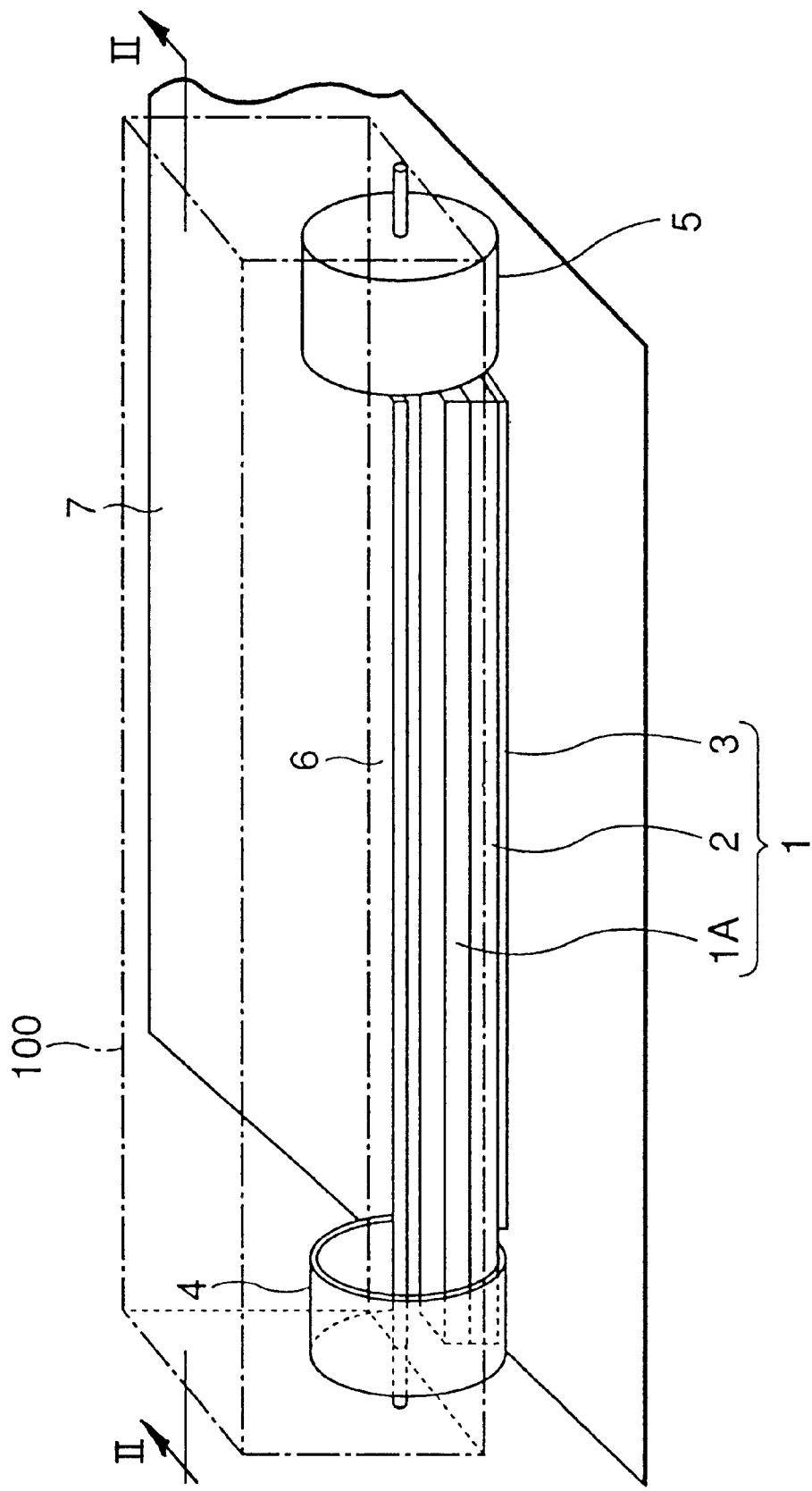
FIG. 1 shows a schematic perspective view of a scanner, which is a preferred embodiment of the present invention.
Figure 2:
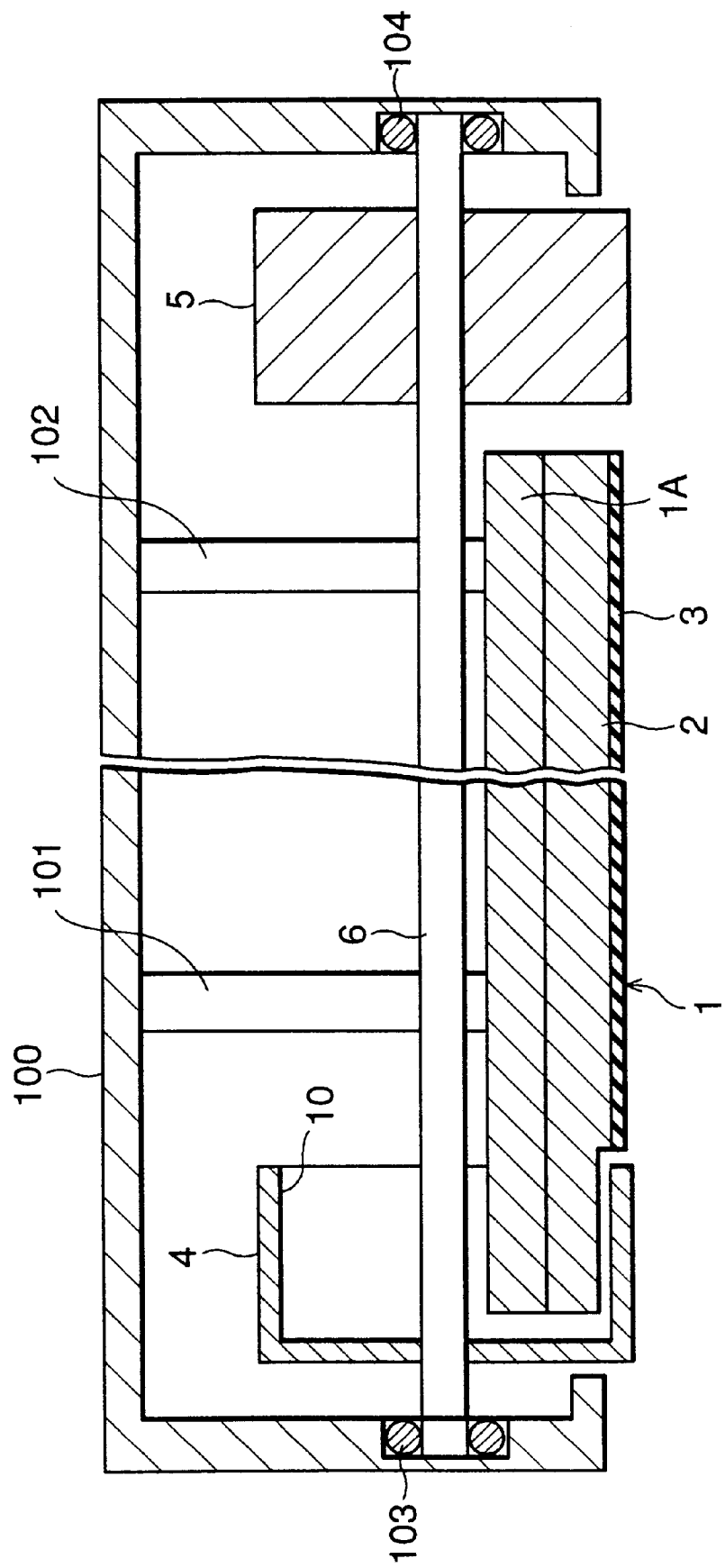
FIG. 2 is a cross-sectional view taken alone line II—II of the scanner of FIG. 1.

Referring to FIGS. 1 and 2, the scanner, which is a preferred embodiment of the present invention, has a close contact type image sensor 1 for reading a picture on an original copy 7 (FIG. 1), a platen 5 arranged on one side of the close contact type image sensor 1, an encoder ring 4 coupled to the platen 5 via a shaft 6, and a housing 100 for accommodating the whole scanner. The close contact type image sensor 1 further has a sensor substrate 1A, an optical guide plate 2 and a reading face glass 3, both fitted over the sensor substrate 1A. On the sensor substrate 1A are mounted an array of light emitting elements for irradiating the reading position of the original copy with light, a CCD for detecting the light reflected from the reading position and other electric circuits.

The housing 100 fixes the close contact type image sensor 1 from above with supporting members 101 and 102. The housing 100 may as well be fixed from sides. The housing 100 also couples the two ends of the shaft 6 via bearings 103 and 104. This arrangement enables the platen 5 and the encoder ring 4 to rotate simultaneously, rotatably supported by the bearings 103 and 104. The platen 5 and the encoder ring 4 are equal in outer diameter and rotating speed. The housing 100 may as well axially support the shaft 6 between the encoder ring 4 and the platen roller 5.

The shaft 6, positioned on the central axis of the platen 5 and the encoder ring 4, is arranged above the close contact type image sensor 1. Parts of the circumferences of the platen 5 and of the encoder ring 4 protrude from the bottom part of the housing 100.

As illustrated in FIG. 2, one end of the close contact type image sensor 1 is located in the encoder ring 4. The reading face glass 3 is not formed within the encoder ring 4. Within the encoder ring 4, the optical guide plate 2 is not in contact with the inner wall of the encoder ring 4, and has a sufficient thickness to resolve a distinguishing pattern 10 provided on the inner wall of the encoder ring 4.

Figure 3:
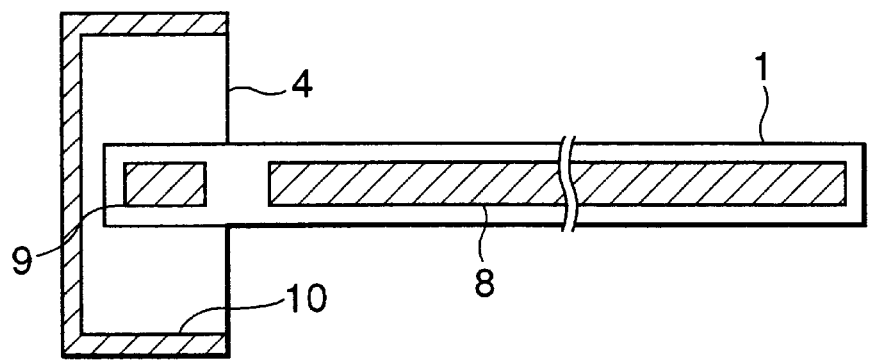
FIG. 3 shows a partial cross-sectional view of the scanner of FIG. 1 seen from above.
Figure 4:
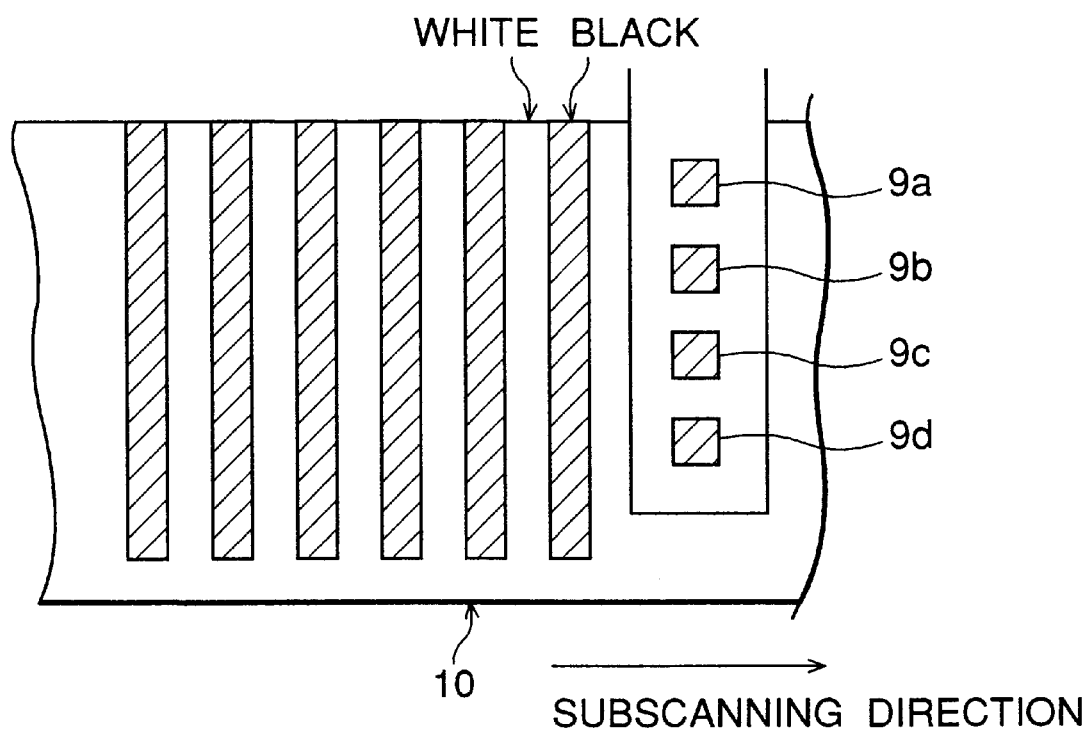
FIG. 4 shows a plan of a distinguishing pattern and speed detecting elements in a developed view of an encoder roller for use in the scanner of FIG. 1.

A reading element device formed on the sensor substrate 1A of the close contact type image sensor 1, as illustrated in FIG. 3, divided into a copy reading element array 8, which constitutes a first reading element device, and a plurality of speed detecting elements 9, constituting a second reading element device. The copy reading element array 8 and the speed detecting elements 9 are arranged in a row in parallel to the main scanning direction and to the shaft 6. The speed detecting elements 9 are positioned outside the copy scanning area and within the encoder ring 4. As shown in FIG. 4, there are four speed detecting elements 9, from 9a through 9d.

On the inner wall of the encoder ring 4 is printed the distinguishing pattern 10, which is read by the speed detecting elements 9. The distinguishing pattern 10 consists of alternate black and white lines, each of which is printed in parallel to the main scanning direction. As the encoder ring 4 rotates, the distinguishing pattern 10 moves in a direction perpendicular (the subscanning direction) to the main scanning direction of the speed detecting elements 9a through 9d. The width of each black or white line in the subscanning direction is sufficiently greater than the reading pitch of each speed detecting elements 9 in the subscanning direction, and each speed detecting element reads each black or white line by scanning it more than once.

Figure 5:
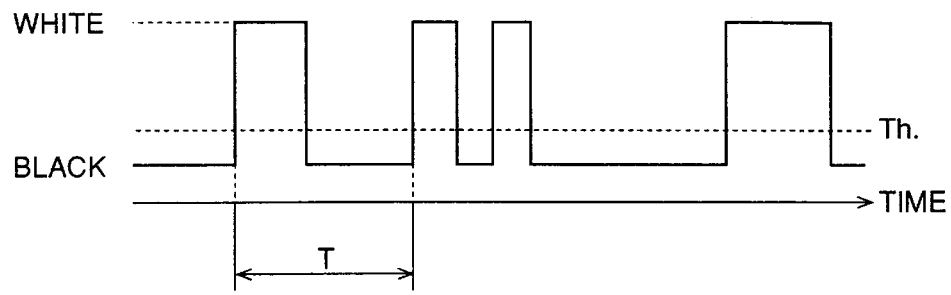
FIG. 5 is a waveform diagram of an output signal given when a speed detecting element has detected the distinguishing pattern.

The rotation of the encoder ring 4 moves the distinguishing pattern 10 and, according to this movement, each bit of the speed detecting elements 9a through 9d supplies a signal of a waveform, for instance, shown in FIG. 5. In this embodiment of the invention, the output signals of the four speed detecting elements are averaged, and binarized according to a prescribed threshold Th to distinguish between black and white. By counting the timing intervals T at which the reading rises from black to white, the elements detect the rotating speed of the encoder ring 4, i.e., the moving speed of the close contact type image sensor 1.

Figure 6:
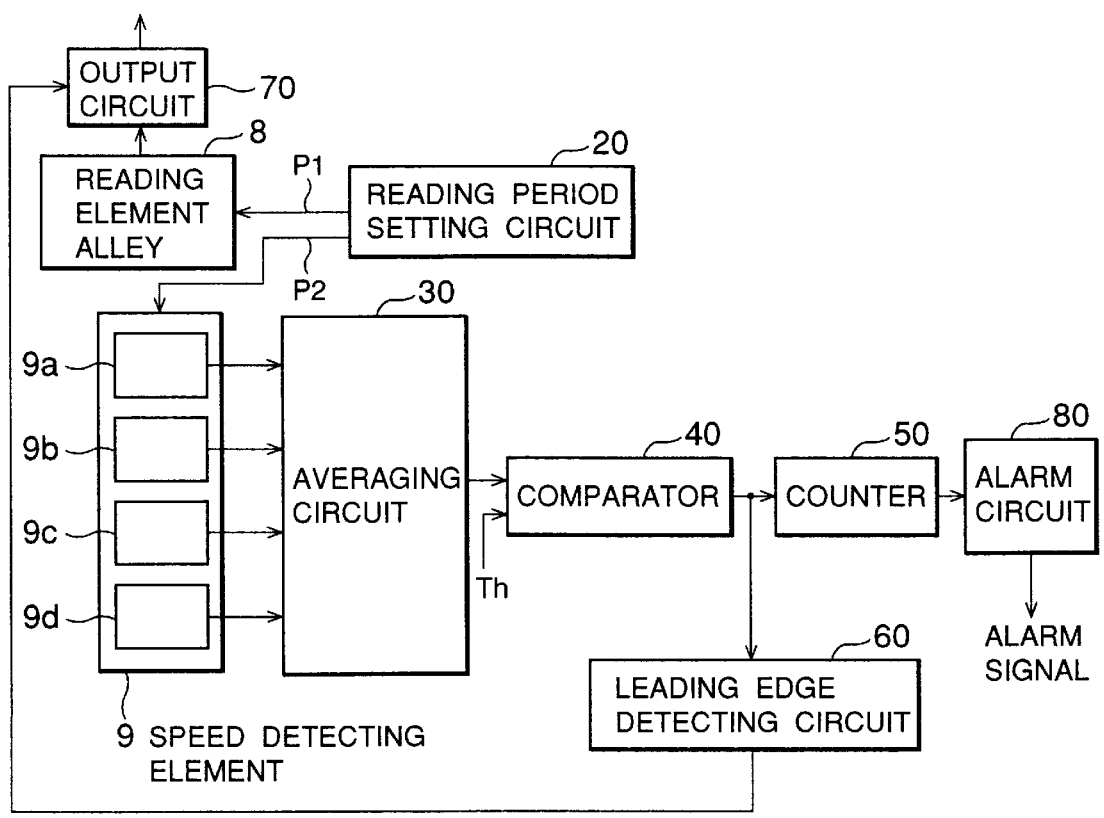
FIG. 6 is a circuit diagram of an electric circuit including the speed detecting circuit of the scanner of FIG. 1.
Figure 7:
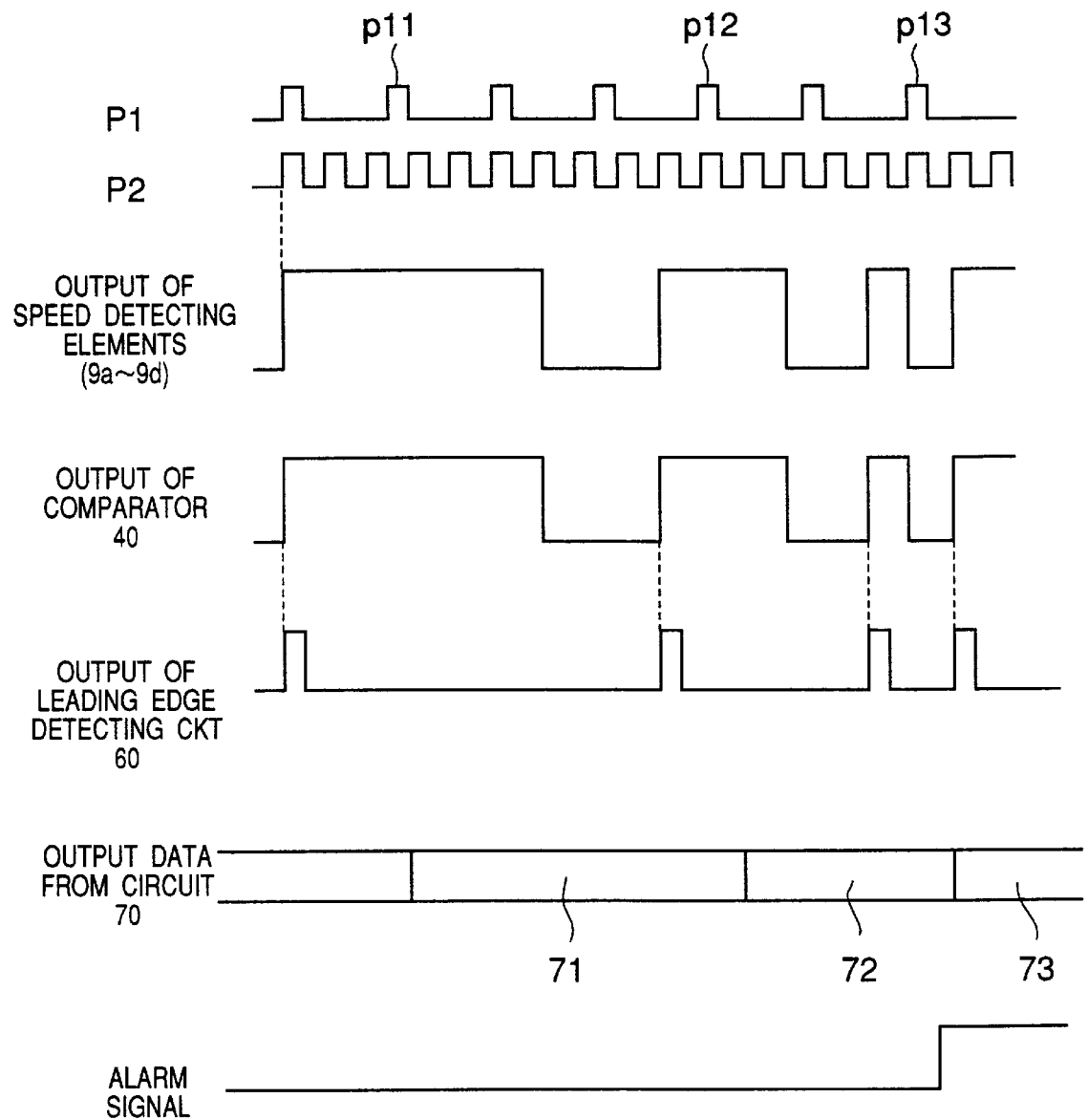
FIG. 7 is a timing chart illustrating the operation of the electric circuit.

FIG. 6 is a circuit diagram of an electric circuit including a circuit for detecting the moving speed. This electric circuit is mounted on the sensor substrate 1A of the close contact type image sensor 1. Referring to FIG. 6, the moving speed detecting circuit has the speed detecting elements 9 (9a through 9d), an averaging circuit 30 and a comparator circuit 40. As illustrated in FIG. 7, a reading period setting circuit 20 generates pulse signals P1 and P2 for directing the reading periods (periods for scanning one line each) of the copy reading element array 8 and the speed detecting elements 9. The speed detecting elements 9a through 9d scan the distinguishing pattern 10 in synchronism with the pulse signal P2, and generate reading outputs of black and white lines as shown in FIGS. 5 and 7. The averaging circuit 30 calculates the averages of the white and black levels (respectively the high and low levels) of the output signals of the speed detecting elements 9a through 9d.

The averaging circuit 30 consists of a circuit which adds the outputs of the individual speed detecting elements and amplifies the sum by ¼. Signals representing the averages of black and white signals (average signals) are supplied to the comparator circuit 40, which compares the average signals with the threshold Th to execute distinction between black and white. The threshold Th is substantially the mean between the black and white levels. Since the averages of the outputs of the plurality of speed detecting elements 9a through 9b, arranged in the main scanning direction, are compared with the threshold to distinguish between black and white, even if the output of one of the speed detecting elements is made erroneous by partial smear of the distinguishing pattern 10, or even if one of the speed detecting elements deteriorates, distinction between black and white can be accurately accomplished. Incidentally if an adder circuit is used in place of the averaging circuit 30 to compare the sums of black and white levels with a threshold, the same effect can be achieved.

The intervals of the output pulse of the comparator circuit 40 represent the moving speed. The faster the moving speed, the shorter the pulse intervals.

A counter 50 counts the timing intervals T (intervals of the white level) at which the level rises from black to white as illustrated in FIG. 5. This counter has an internal pulse source for generating high speed pulse signals, counts the high speed pulse signals during the intervals T, and supplies the count as the rotating speed of the encoder ring 4, i.e., the moving speed of the close contact type image sensor 1 in the subscanning direction. The faster the moving speed, the lower the output of the counter 50.

Unless the moving speed of the scanner is lower than the copy reading speed of the copy reading elements 8, the readings of the picture in the subscanning direction cannot be equalized. In view of this point, a moving speed alarm circuit 80 checks, on the basis of the output of the counter 50, whether or not the moving speed is faster than the copy reading speed. More specifically, the moving speed alarm circuit 80 checks whether or not the output of the counter 50 is below a reference level and, if it is, issues an alarm signal. The reference level here is the reading of the counter 50 when the moving speed of the scanning (ms/line) is identical with the copy reading speed (ms/line).

As illustrated in FIG. 7, the reading period setting circuit 20 sets the period of the pulse signal P2 (the reading period of the speed detecting elements 9) shorter than the period of the pulse signal P1 (the reading period of the copy reading elements 8) to accurately detect the moving speed even if the moving period of the close contact type image sensor 1 is faster than the copy reading speed.

For practical purposes, both the reading speed of the apparatus and the speed of human manual motions should be taken into consideration, but if the copy reading speed is 2.5 ms/line for example, a 1 ms/line reading period of the speed detecting elements 9, i.e. 1/2.5 of the copy reading period, or less would be short enough. In this case, a moving speed of 2.5 times the copy reading speed at the maximum can be detected. Thus the output of the comparator circuit 40 will be sufficiently reliable if the scanner moves at a speed of no more than 2.5 times the copy reading speed.

A leading edge detecting circuit 60 detects the leading edge of the output of the comparator circuit 40, and supplies a rise pulse to an output circuit 70, which supplies output data 71, 72 and 73, which are read and outputted in response to the pulse signals P1 (p11, p12 and p13 in FIG. 7) generating immediately after rise pulses. This leading edge detecting circuit 60 and the output circuit 70 control the generation timing of the copy reading output according to the moving speed, and make possible stable reading inresponse to the moving speed.

Figure 8:
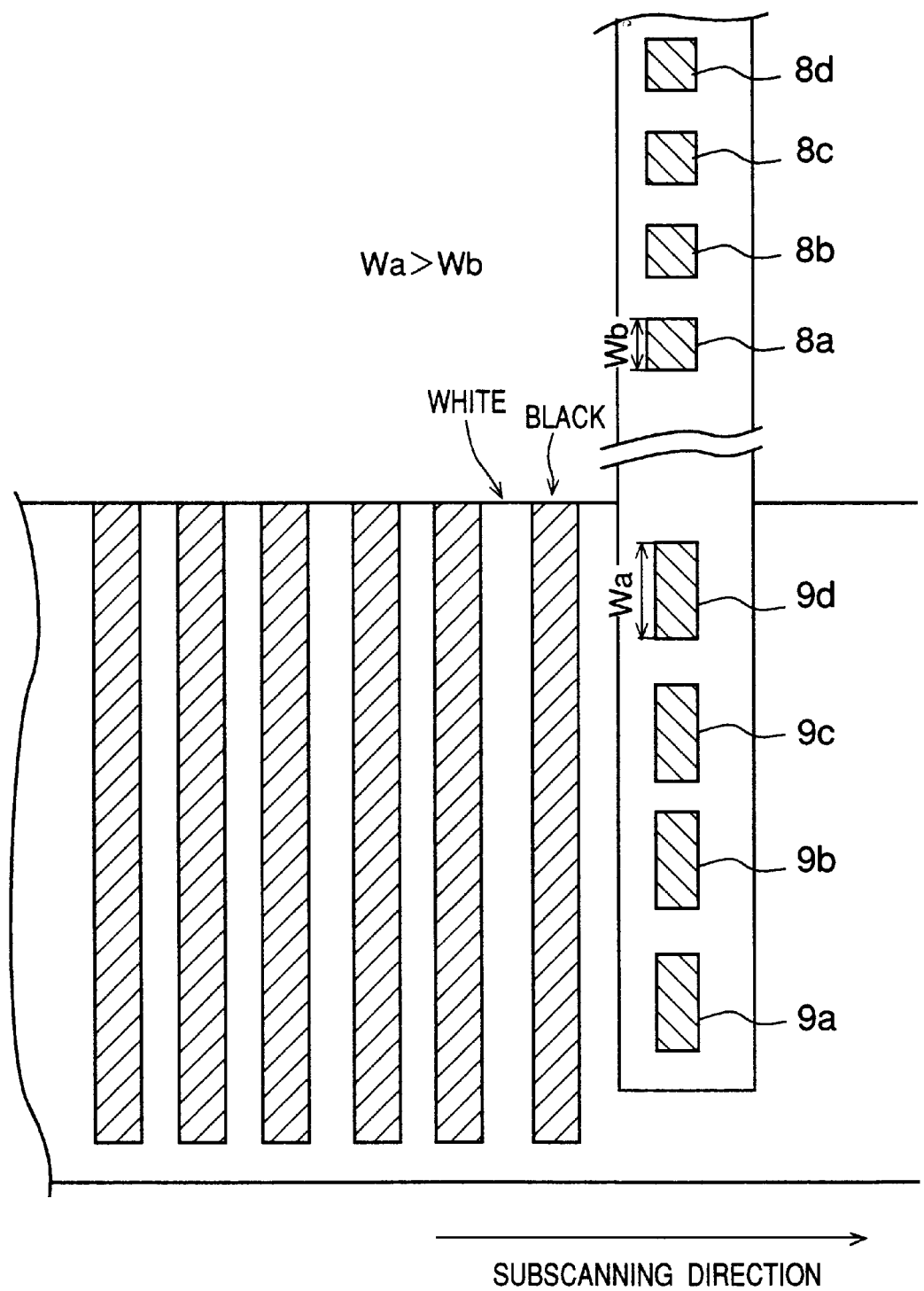
FIG. 8 shows a plan of another example of speed detecting element.
Figure 9:
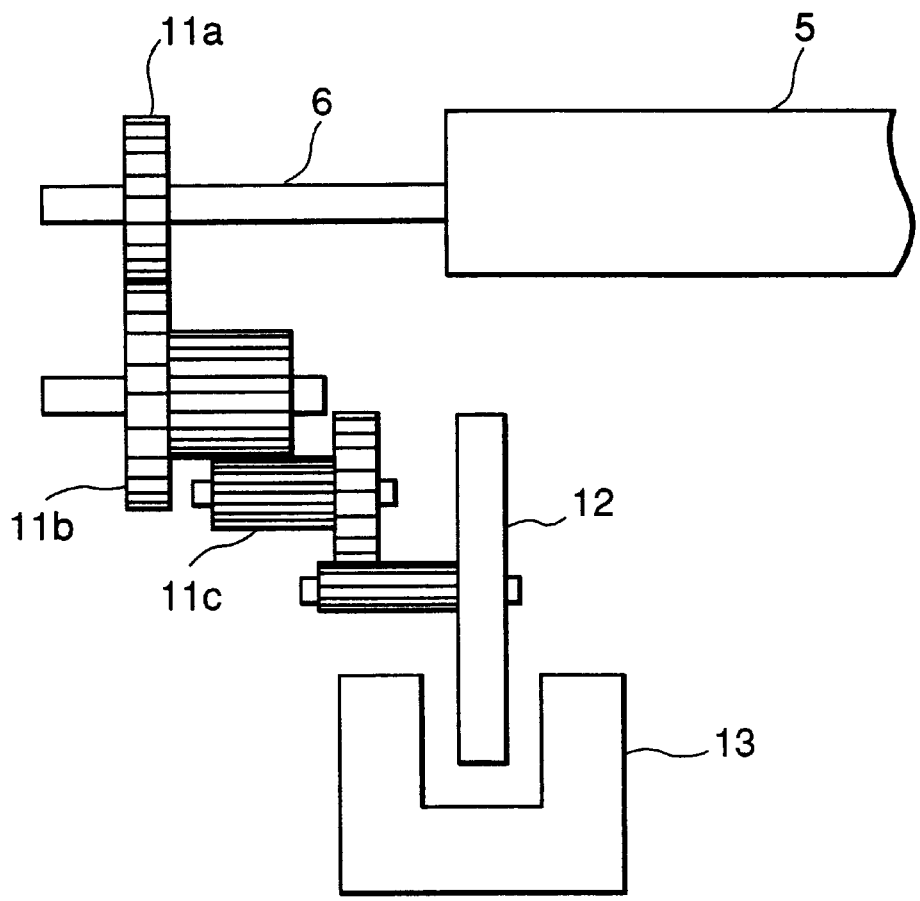
FIG. 9 shows a schematic front view of the speed detecting mechanism of a scanner according to the prior art.
Figure 10:
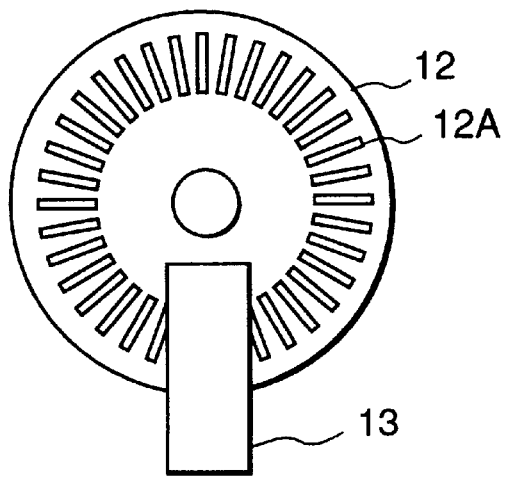
FIG. 10 shows a plan of an encoder gear for use in the speed detecting mechanism of FIG. 9.
Figure 11:
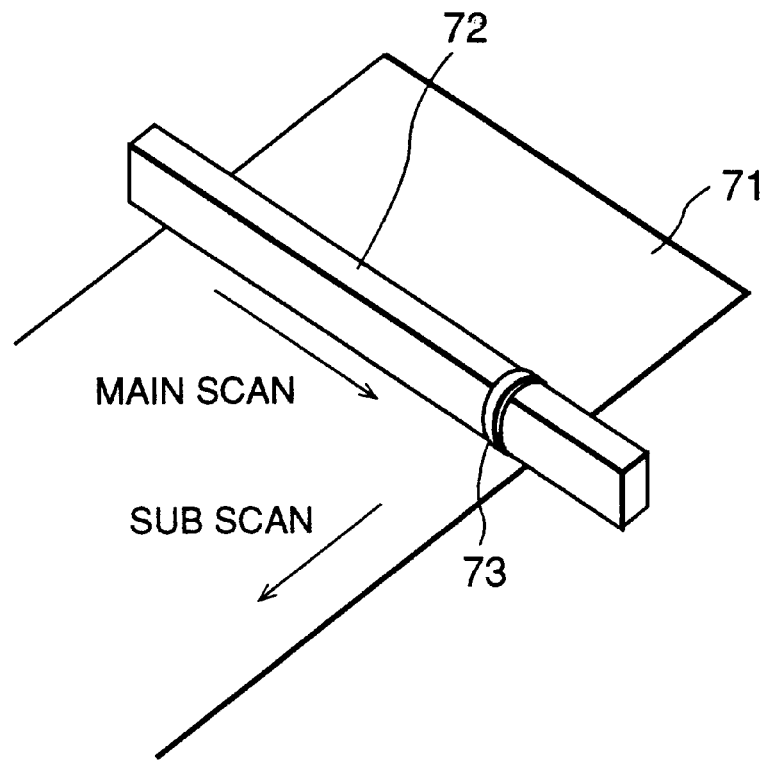
FIG. 11 shows a schematic perspective view of another scanner according to the prior art.
Figure 12:
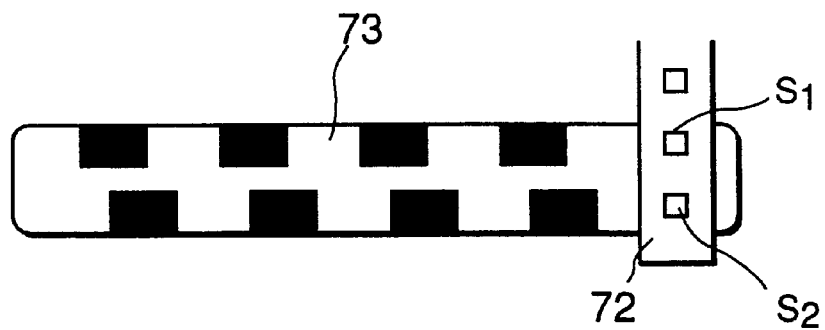
FIG. 12 shows a plan of the belt part of the scanner of FIG. 11.

FIG. 8 shows a plan of a second form in which the speed detecting elements 8 can be embodied. Referring to FIG. 8, the window length wa of the speed detecting elements 9 in the main scanning direction is greater than the window length wb of the copy reading elements 8 in the main scanning direction.

Even if the reading period (Ta) of the speed detecting elements is reduced to, for instance, ½ of the reading period (Tb) of the copy reading elements 8, where wa is equal to (Tb/Ta)·wb, the output signal level can be prevented from dropping by equalizing wa to 2wb, thereby eliminating deterioration of resolution.

As earlier described, the preferred embodiment of the present invention makes it possible to detect the moving speed of the hand scanner with a simple structure having a close contact type image sensor and an encoder ring, the latter coupled to a platen roller by the same shaft, and thereby enables the number of parts, cost and size of the apparatus itself to be reduced. Furthermore, since no gear intervenes between the platen and the encoder ring, the scanner is free from the play of gears, to which conventional scanners are subject, and makes possible accurate detection of the moving speed.

Moreover, as the reading period of the speed detecting elements 9 is shorter than that of the copy reading element array 8, the moving speed can be accurately detected even if the moving speed of the close contact type image sensor 1 is faster than the copy reading speed.

The embodiment of the invention, with its plurality of speed detecting elements, frees the detection from the adverse effects of dust or smear on the distinguishing pattern 10 of the encoder ring 4 by adding the readings of the speed detecting elements and comparing the sum with a threshold.

It goes without saying that the speed detecting elements according to the invention can be adapted to various types of close contact type image sensors by varying the size, number and distinguishing pattern of the elements.

What is claimed is:

1. A manual scanner comprising:
   a close contact type image sensor having first reading elements arranged along a main scanning direction and second reading elements arranged outside a scanning area along the main scanning direction, wherein the first reading elements read an original copy and the second reading elements read a predetermined distinguishing pattern independently of the first reading elements;
   a cylindrical rotating body rotatable in a subscanning direction and having an internal face that faces the second reading elements, the internal face having the predetermined distinguishing pattern, wherein the second reading elements read the distinguishing pattern to detect a rotation speed of the cylindrical rotating body;

a platen roller arranged on an opposite side of the cylindrical rotating body and connected to the cylindrical rotating body with a shaft so that the platen roller and the cylindrical rotating body roll together at the same speed, the second reading elements positioned between the platen roller and the cylindrical rotating body; and detecting means for detecting the rotating speed of the cylindrical rotating body on the basis of detection output signals of the second reading elements, wherein the detecting means reads the second reading elements for a shorter period than the first reading elements.

2. The scanner as claimed in claim 1, wherein said distinguishing pattern consists of alternate black and white parts arranged in said subscanning direction.

3. The scanner as claimed in claim 2, wherein said detecting means comprises adder means for adding the detection output signals of said second reading elements and comparator means for comparing the output of the adder means with a predetermined threshold.

4. The scanner as claimed in claim 2, wherein said detecting means comprises average output means for supplying black and white average signals respectively representing the averages of the white and black levels of the output signals of the plurality of said second reading elements, and distinguishing means for comparing said black and white average signals with a threshold and distinguishing between black and white.

5. The scanner as claimed in claim 3, further including alarming means for issuing an alarm signal when, on the basis of the output of said comparator means, the moving speed due to the rotation of said encoder roller has surpassed the reading speed of said first reading elements.

6. The scanner as claimed in claim 1, wherein a detection area of each of said second reading elements in said main scanning direction is wider than that of said first reading elements in said main scanning direction.

7. The scanner as claimed in claim 6, wherein the width (wa) of the detection area of each of said second reading elements in said main scanning direction and the width (wb) of said first reading elements in said main scanning direction has a relationship of wa=(Tb/Ta)·wb, where Ta is the reading period of said second reading elements and Tb is the reading period of said first reading elements.

8. The scanner as claimed in claim 4, further including alarming means for issuing an alarm signal when, on the basis of the output of said comparator means, the moving speed due to the rotation of said encoder roller has surpassed the reading speed of said first reading elements.

* * * * *